Patented Nov. 17, 1942

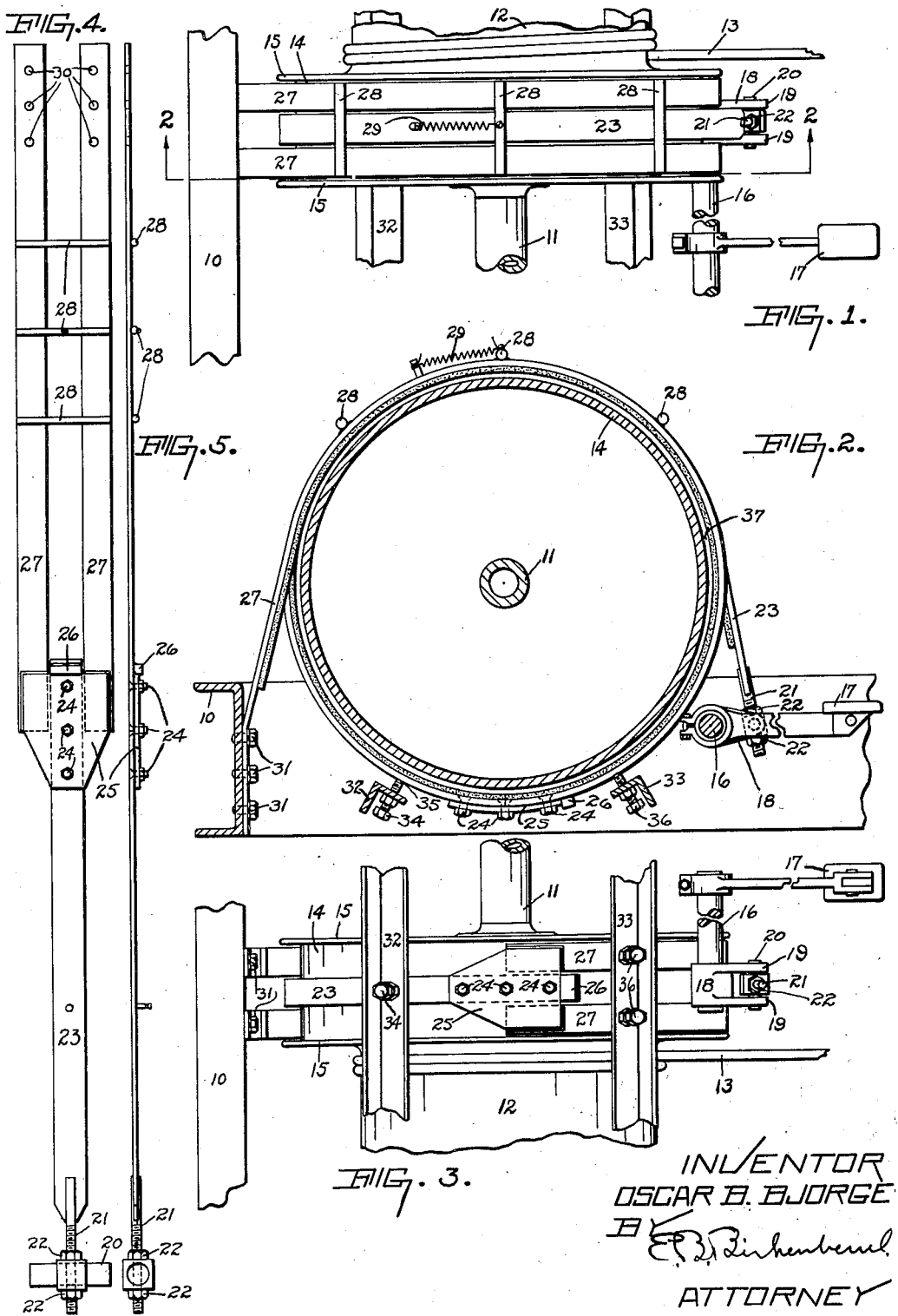

2,302,521

UNITED STATES PATENT OFFICE 2,302,521

BAND BRAKE MECHANISM

Oscar B. Bjorge, Portland, Oreg.

Application November 18, 1940, Serial No. 366,062

1 Claim. (Cl. 188—77)

This invention relates generally to friction applying devices and particularly to band brake mechanisms.

The main object of this invention is to construct a band brake mechanism by means of which the arc of contact can be easily increased from 270 degrees to 540 degrees or more.

The second object is to provide a band brake mechanism especially adapted for use on what are known as loading donkeys or hoists by means of which heavy logs are picked up and placed upon railroad cars or trucks requiring that the lowering of the logs be performed without undue violence.

The third object is to construct a band brake mechanism of the class described and for the purpose set forth in a manner to prolong the life of the equipment, safeguard the lives and persons of its operators and to reduce the amount of physical effort required to satisfactorily lower a log upon a truck or car.

The fourth object is to so apply the band brake mechanism that the wearing action will be exceedingly uniform throughout the entire area of contact.

The fifth object of this invention is to construct a band brake mechanism of the class described which will be uniformly released and applied about the entire circumference of the drum around which the band operates.

These and other objects are accomplished in the manner set forth in the following specification as illustrated in the accompanying drawing, in which:

Fig. 1 is a fragmentary plan showing a portion of a cable-winding drum having a brake drum associated therewith and showing my device applied thereto.

Fig. 2 is a fragmentary vertical section taken along the line 2—2 in Fig. 1.

Fig. 3 is a fragmentary bottom view of Fig. 1.

Fig. 4 is a plan of the brake band showing it in a straight line position.

Fig. 5 is a side elevation of Fig. 4.

Similar numerals refer to similar parts throughout the several views.

Referring in detail to the drawing, there is shown a frame 10 upon which is mounted the mechanism, not shown, of which the brake band mechanism I am about to describe forms a part. On the frame 10 is mounted the drum shaft 11 to which is attached a cable-winding drum 12 upon which is wound the cable 13 for any desirable purpose.

Also attached to the shaft 11 and the drum 12 is the brake drum 14 which is preferably provided with the side flanges 15. The usual rock shaft 16 journals in the frame 10 and carries the foot brake lever 17 and the forked brake band lever 18, between whose ends 19 is disposed the pivot bar 20 through which extends the bolt 21 which may be locked by the nuts 22.

The bolt 21 is secured to one end of the middle brake band 23 against one side of which is secured, by means of the bolts 24, a gusset plate 25. It will be understood that the connection between the plate 25 and the band 23 is removable for manufacturing, installation, and repair purposes.

A shear lug 26 is permanently secured to the end of the band 23 and engages the end of the plate 25, thereby preventing the bolts 24 from being placed in shear. Permanently secured to the plate 25 on opposite sides of the band 23 are the pair of outer bands 27 which are held in spaced relationship by the transverse bars 28.

The bands 27 are provided with the bolt holes 30 which receive the bolts 31. The bands 23 and 27 are placed around the drum 14 and secured in position by means of the bolts 31, 24, and 21, as shown in Fig. 2.

Transverse angle bars 32 and 33 are supported by the frame 10 on the underside of the drum 14, as shown in Fig. 5. The bar 32 has threaded therethrough a single bolt 34 whose end 35 bears against the middle brake band 23. The bar 33 is provided with a pair of bolts 36, one of which bears against each of the outer bands 27. The positioning of the bolts 34 and 36 is such as to hold the bands 23 and 27 in a circular form, concentric with the drum 14. It will be noted that the line of the fastening bolts 31 of the double bands 27 is not tangential with relation to the drum 14, the purpose of this being to hold the anchored end of the band free of the drum. That is, when the brake is not applied, the portion of the bands 27 between the bolts 31 and the point of tangency on the drum 14 will flex outwardly.

It will be noted in Fig. 2 that the brake is in a released position, and that the clearance space 37 (much enlarged) is substantially uniform around the entire surface of the drum 14. This is due to the fact that the lower portion of the band 23 rests upon the bolt 34, while the lower ends of the band portions 27 rest upon the bolts 36, and the portions of the band parts 23 and 27 on the top side of the drum 14 are held in uniform relationship in a transverse direction, while relatively movable in a circumferential direction.

Not only do the bars 28 provide a means for holding the free band in correct lateral relationship, but they insure the unsupported outer bands 27 being supported by the arched middle band 23.

The relative movements between the bands 23 and 27 may be improved by the addition of a spring 29 which is secured to the band 23 and to one of the bars 28.

I claim:

A band brake mechanism of the class described wherein a brake drum is mounted on a horizontal axis and having three brake bands encircling said drum, two of which are wound around the drum in one direction and one of which is wound around the drum in the opposite direction between the other two, the three bands being removably joined on the underside of the drum while the opposite ends of the two bands are anchored to a support while the remaining end of the third band is attached to an operating lever, a spring on the top side of said bands urging the top portion thereof in opposite directions and means for maintaining the double and single portions of the bands in cylindrical and lateral relationship.

OSCAR B. BJORGE.